United States Patent Office 3,470,377
Patented Sept. 30, 1969

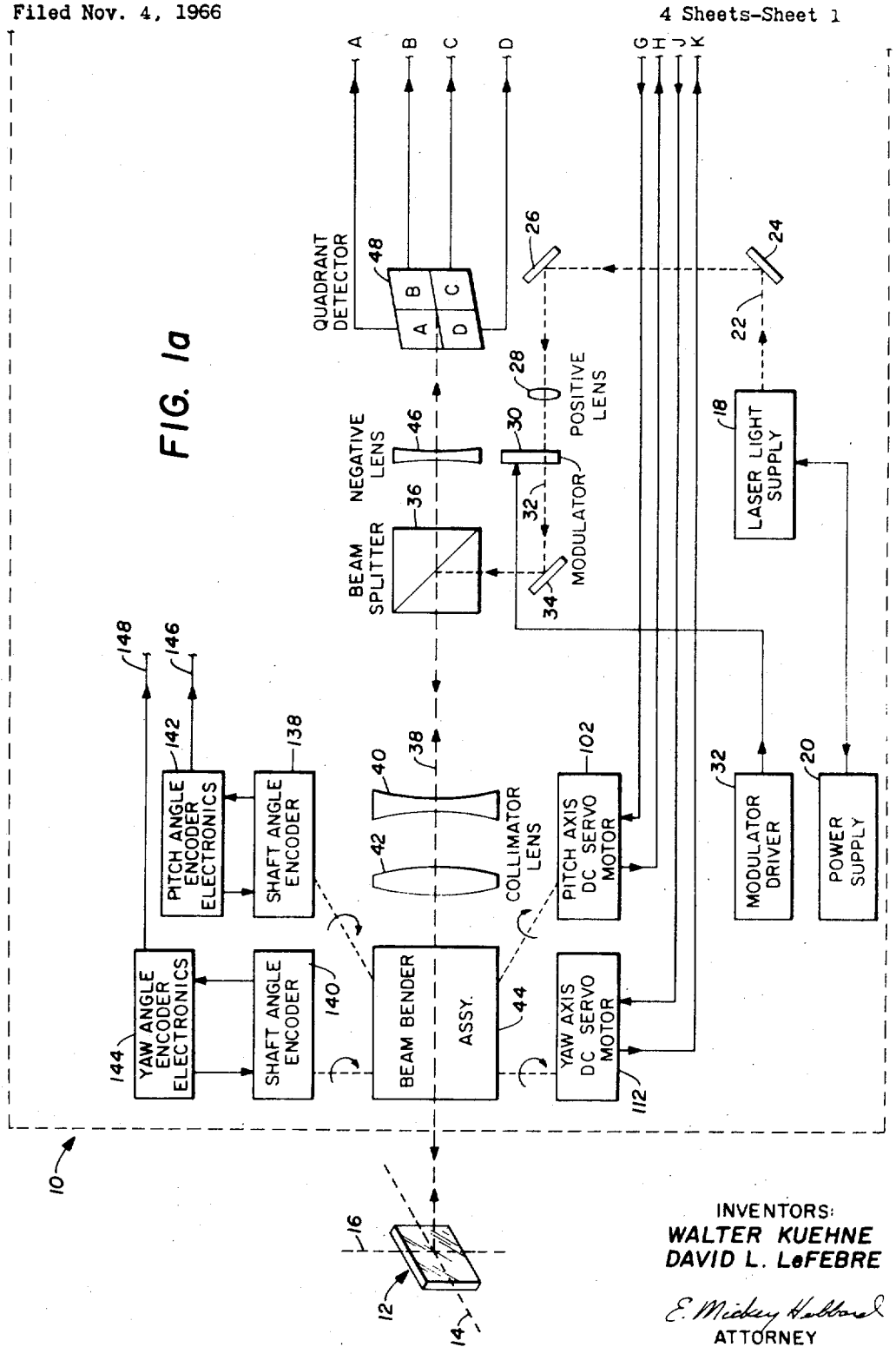

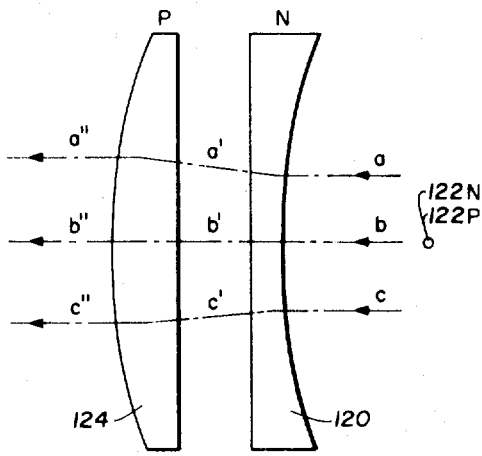
FIG. 2a
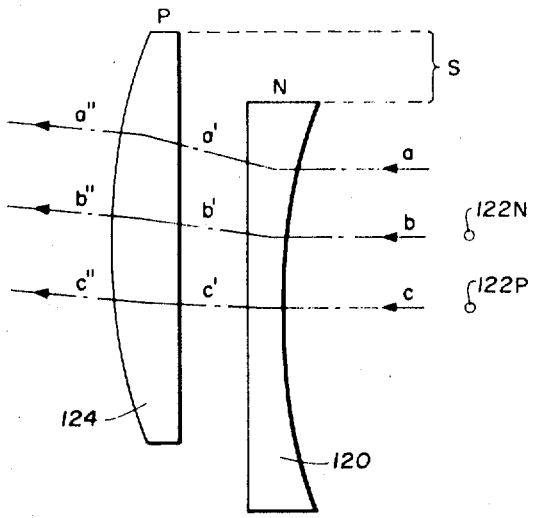
FIG. 2b
FIG. 3a
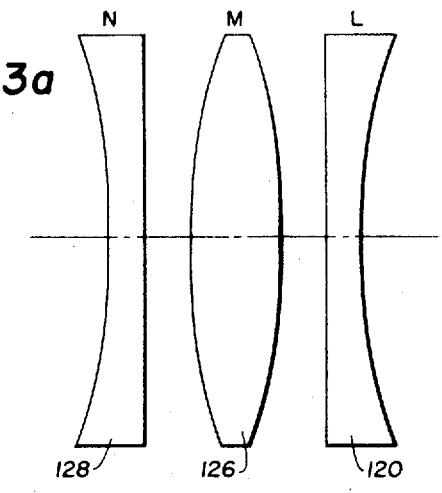
FIG. 3b
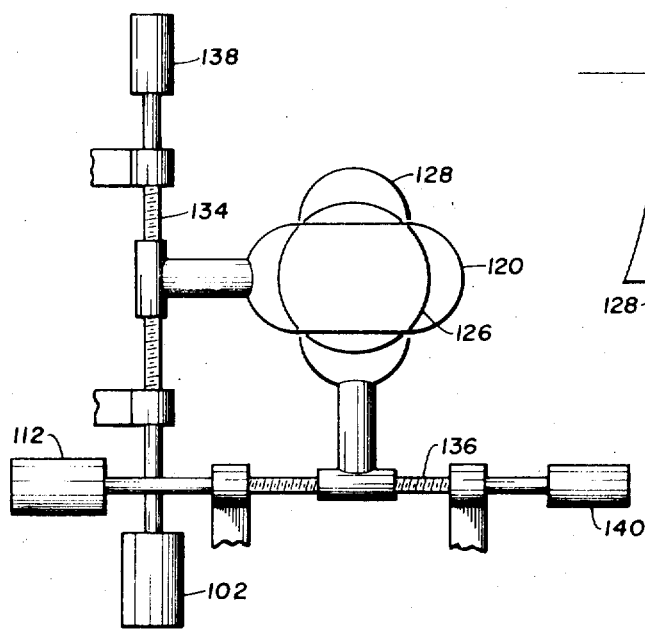
INVENTORS:
WALTER KUEHNE
DAVID A. LeFEBRE
ATTORNEY

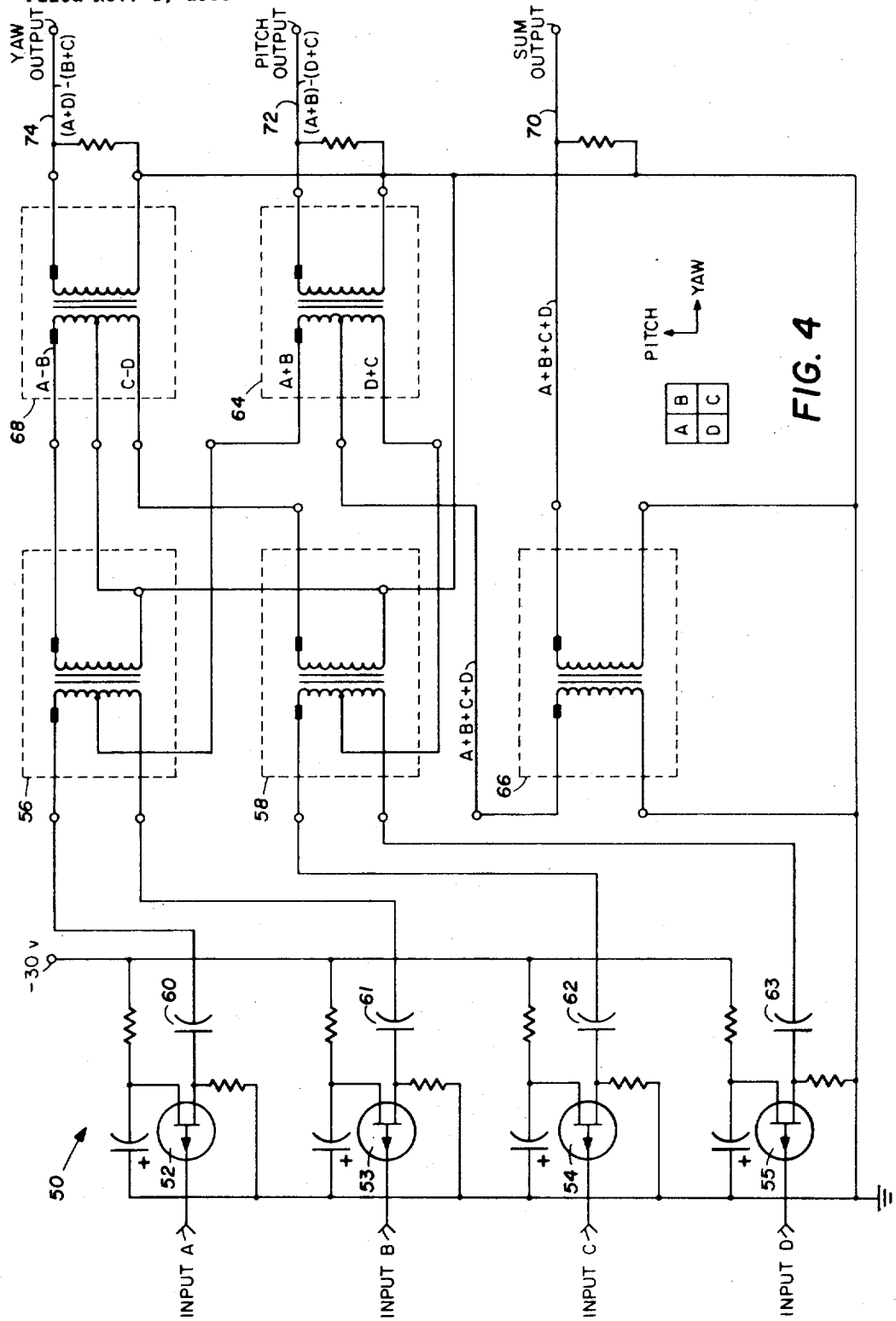

3,470,377
TWO-AXIS AUTOMATIC AUTOCOLLIMATOR
David A. Le Febre, Richardson, and Walter Kuehne, Dallas, Tex., assignors to Texas Instruments Incorporated, Dallas, Tex., a corporation of Delaware
Filed Nov. 4, 1966, Ser. No. 592,164
Int. Cl. G01j 1/36
U.S. Cl. 250—204       14 Claims

ABSTRACT OF THE DISCLOSURE

An autocollimator is a device for determining the position of a body relative to the autocollimator by projecting a light beam through an optical system onto a reflecting surface and measuring the position of the reflected beam to determine the position of the reflecting surface. An automatic autocollimator is one which determines the position of the reflecting surface automatically and usually produces an electrical signal, either analog or digital, representative of the position of the reflecting surface. The position of the reflecting surface can generally be described with respect to an optical axis by pitch movement about an axis normal to the optical axis, yaw movement about an axis normal to the optical axis and pitch axis, roll movement as pivotal movement about the optical axis, and also translational movement along each of these three axes.

---

This invention relates generally to apparatus for detecting the position of an observed body relative to a reference body, and more particularly, but not by way of limitation, relates to an automatic autocollimator for determining the pitch, yaw and normal translation of the observed body relative to the reference body.

---

This invention is concerned with a system for determining the yaw and pitch of a reflective surface, and, in one modification, for also determining yaw and pitch translation.

An important object of this invention is to provide such a system which is relatively simple and less expensive, has a minimum number of moving parts, a minimum number of light sources, has more stability under environmental changes, and greater accuracy over the life of the system.

Another object of the invention is to provide a nonmechanical means for detecting small angular or linear translations of a beam of light in two axes.

Another object of the invention is to provide a system which automatically compensates for decay in the detectivity of the photosensing means.

Yet another object is to provide a system which automatically compensates for variations in the intensity of the light source.

A further object is to provide a system which automatically compensates for distortions in the modulation of the light source.

Still another object of the invention is to provide such a system which is not dependent upon high tolerance mechanical or optical components for accuracy.

Another very important object is to provide a system having extremely high resolution.

A further object is to provide a system which is not dependent upon critical adjustments for accuracy.

Yet another object is to provide a system capable of detecting oscillatory movements of the observed body over a wide range of frequencies.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURES 1a and 1b, collectively, form a schematic block diagram of a system constructed in accordance with the present invention;

FIGURES 2a and 2b are schematic drawings which serve to illustrate the operation of the beam bender assembly illustrated in FIGURE 1a;

FIGURES 3a and 3b are schematic drawings illustrating the beam bender of FIGURE 1a; and FIGURE 4 is a schematic circuit diagram of the transformer hybrid sum and difference network of FIGURE 1b.

Figure 1B:
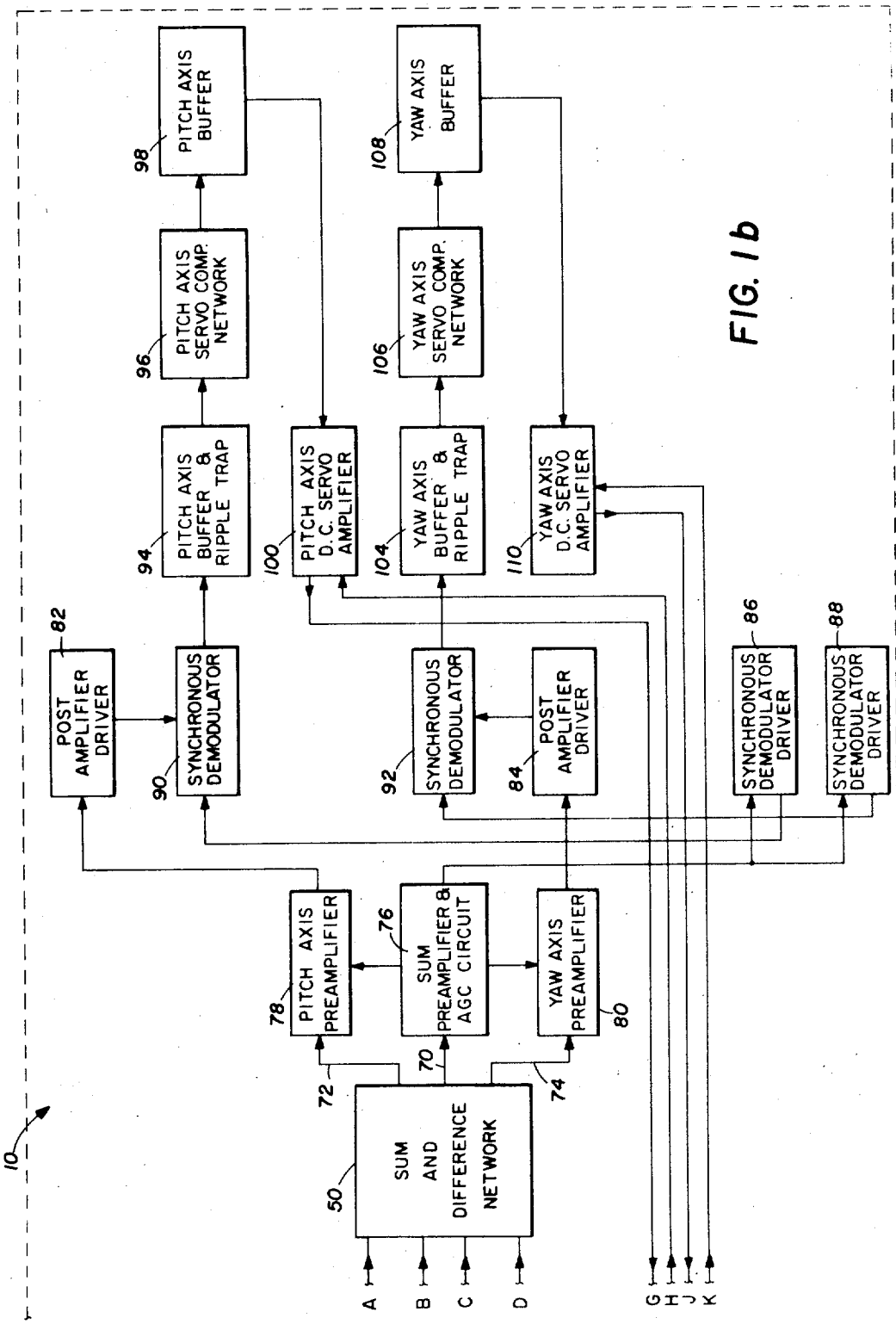

Referring now to the drawings, a system constructed in accordance with the present invention is indicated generally by the reference numeral 10 in FIGURES 1a and 1b. The system 10 is adapted to detect the angular position of a reflection body 12 about a pitch axis 14 and a yaw axis 16. As will hereafter be pointed out in greater detail, translational movement of the body 12 along both the pitch axis 14 and the yaw axis 16 can be detected by modifying the system to position the light source on the body 12.

The system 10 utilizes a single laser light source 18 driven by a power supply 20 for projecting a collimated light beam 22, which may typically have a wave length in the near infrared region. By using such frequency, the system is nonsensitive to ambient light. However, it is to be understood that a light source of any frequency compatible with the sensors presently to be described can be used, and further that the light may be collimated optically. The collimated beam 22 is then reflected by mirrors 24 and 26 and directed through a positive lens 28 which is used to focus the beam as it passes through the modulator 30. The modulator 30 is typically a tuning fork chopper which is driven by a tuning fork driver circuit 32. As a result of the modulator 30, the light beam is now modulated to have a functional frequency corresponding to that of the modulator 30. The modulated light beam 32 is then reflected by a mirror 34 and directed through a prism beam splitter 36 which directs a portion of the beam along an optical axis 38 through collimator lenses 40 and 42 and then through a beam bender assembly 44 onto the reflection surface of the body 12. The beam is then reflected from the body 12 back through the beam bender assembly 44, the collimator lenses 42 and 40, the prism beam splitter 36 and a negative lens 46 which focuses the beam onto a quadrant detector 48. The function of the quadrant detector 48 is to detect the position of the light beam relative to both the pitch axis and the yaw axis, the pitch axis being the line dividing quadrants A and B from quadrants C and D and the yaw axis being the line dividing quadrants A and D from quadrants B and C. The quadrant detector 48 is preferably of the type sold by Texas Instruments Incorporated, Dallas, Tex., as quadrant silicon photovoltaic detector SIV 7408. This device essentially comprises four separate photovoltaic diodes fabricated on a common semiconductor substrate and produces four separate voltage signals, one representative of each of the four quadrants A–D which are provided on the outputs A–D. Each of these voltages is representative of the number of photons striking the respective quadrants. The voltage level produced by these devices tends to decay with time for a given photon input and one advantage of this invention is the compensation of this decay.

The four voltage outputs A–D from the quadrants are applied to the transformer hybrid sum and difference network indicated generally by the reference numeral 50 in FIGURE 1b and shown in detail in FIGURE 4. The network 50 includes four input field effect transistors 52, 53, 54 and 55 which are connected in source-follower configuration. The input field effect transistors 52–55 provide a very high input impedance and prevent loading of the silicon quadrant detector 48. The output impedance of the field effect transistors 52–55 is very low to match the reflected impedance of transformers 56 and 58 to which the sources are capacitively coupled by capacitors 60–63, respectively.

Transformer 56 produces the sum of the voltage signals $A+B$ on the center tap of the primary winding. Similarly, the sum of input signals $C+D$ are summed at the center tap of the primary winding of transformer 58. These two summation voltage signals are applied to the primary winding of transformer 64 to provide a summation voltage equal to the sum of the input voltages A–D at the center tap of the primary winding of transformer 64. This total summation signal is then passed through an isolating transformer 66 and appears at a total sum output 70. The difference between input voltage signals A and B is produced across secondary winding of transformer 56 and the difference of input signals C and D is produced across the secondary winding of transformer 58. These two difference signals are applied to the primary winding of transformer 68 to produce a voltage signal on the secondary winding of transformer 68 equal to the sum of input voltages A and D less the sum of input voltages B and C at yaw output 72. Similarly, the sum signals $A+B$ and $D+C$ are applied to the primary winding of transformer 64 to produce a difference voltage at pitch output 74 equal to the difference between the sum voltage $A+B$ and the sum voltage $D+C$. It should be pointed out at this point that the minus notation is indicative that the voltage signal has been inverted and is out of phase with the voltage signals which have been designated as positive and which are in phase with the modulated light striking the quadrant detector. Thus, the sum signal 70 is in phase with the modulated light signal and its amplitude is representative of the total photon count of the light beam falling on all four quadrants. Thus, the sum signal at output 70 can be used for both automatic gain control and demodulation purposes as will now be described.

Output 70 is connected to a sum preamplifier and automatic gain control circuit 76. Output 72 is connected to the input of a pitch axis preamplifier 78, and output 74 is connected to the input of a yaw axis preamplifier 80. The sum preamplifier includes a conventional closed loop automatic gain control circuit for maintaining the output of the amplifier 76 at a constant amplitude. The signal generated by the automatic gain control circuit is also fed back to the pitch and yaw axis preamplifiers 78 and 80 to change the gain of these amplifiers by a proportional amount and thereby maintain the output signals in the proper relationship to the automatically controlled sum signal at the output of amplifier 76. This automatic gain control provides a means for maintaining the overall gain of the closed loop substantially constant even though the intensity of the light supply 18 or the detectivity of the detector 48 may decay. The output from the pitch axis preamplifier is coupled to a post amplifier driver 82 and the output from the yaw axis amplifier 80 is coupled to a post amplifier driver 84. The output from the sum preamplifier 76 is coupled to a pair of synchronous demodulator drivers 86 and 88. The demodulator drivers 86 and 88 supply synchronous reference signals, which are actually the sum signals derived from the hybrid sum and difference network 50, for synchronous demodulator circuits 90 and 92, respectively. The outputs of the post amplifier drivers 82 and 84 are also applied to demodulators 90 and 92, respectively. The output of synchronous demodulator 90 is an analog D.C. voltage the polarity of which is determined by the phase of the yaw axis signal with respect to the phase of the sum signal, which serves as the reference signal, and the magnitude of which is proportional to the amplitude of the yaw axis signal. Similarly, the output of the synchronous demodulator 92 is an analog D.C. voltage the polarity of which is determined by the phase relationship between the pitch axis signal sum amplifier 84 and the sum signal from driver 88 and the magnitude of which is related to the amplitude of the pitch axis voltage signal. The output from the synchronous demodulator 90 is applied through a buffer and ripple trap 94, a servo compensator network 96, and buffer 98 to a D.C. servo amplifier 100. The servo amplifier 100 drives a pitch axis D.C. servo motor 102 of the beam bender assembly 44. Similarly, the output from the synchronous demodulator 92 is passed through a buffer and ripple trap 104, a servo compensator network 106 and a buffer 108 to drive a yaw axis D.C. servo amplifier 110. Servo amplifier 110 drives a yaw axis D.C. servo motor 112 of the beam bender assembly 44.

The beam bender assembly 44 can best be understood by reference to FIGURES 2a and 2b. When a collimated light beam, represented by rays $a$, $b$ and $c$ in FIGURE 2a, passes through a negative lens 120, it is diverged in such a manner as to appear to have originated at the focal point 122 of the negative lens appears as rays $a'$, $b'$ and $c'$. When the rays $a'$ and $b'$ pass through a positive lens 124, they are bent back toward the axis. If the focal length of the positive lens is numerically equal to the focal length of the negative lens, then the rays $a''$, $b''$ and $c''$ will again be parallel with each other and with rays $a$, $b$ and $c$. It will be noted that ray $b$, which passes through the axis of the lens, is not bent by either lens 120 or lens 124 because the positive and negative lenses are aligned.

If the negative lens 120 is displaced downwardly by a distance S as indicated in FIGURE 2b, rays $a'$ and $b'$ will be bent upwardly, but ray $c'$ will not be bent because it passes through the center of the negative lens 120. The divergence angle between rays $a'$ and $c'$ is the same as shown in FIGURE 2a. The positive lens 124 has a converging effect on the rays which causes rays $a''$, $b''$ and $c''$ to be parallel with each other, but directed upwardly with respect to the entering rays $a$, $b$ and $c$. The two lens system illustrated in FIGURES 2a and 2b is thus capable of bending the beam in one plane when the lens 120 is translated linearly. However, by providing two pair of these lenses in tandem, the beam can be bent in two axial directions by simple linear movement of the two negative lenses along orthogonal paths. Such a system is illustrated in FIGURE 3a wherein the center positive lens 126 is maintained stationary and negative lens 120 would be moved vertically on the sheet to bend the beam in a vertical plane and the negative lens 128 would be moved perpendicular to the sheet to bend the beam in a horizontal plane. It can be shown that the same results can be achieved by replacing the negative lenses 120 and 128 with positive lenses and replacing the positive lens 126 with a negative lens. The order of the lenses has no effect on the performance of the beam bender. However, when the two positive lenses are combined into the single lens, the single lens has half the focal length of each of the negative lenses, rather than an equal focal length.

The basic lens system illustrated in FIGURE 3a is incorporated in the beam bender assembly 44 as illustrated in FIGURE 3b. Thus, lens 120 is translated linearly along a vertical line by a ball screw 134 driven by the pitch axis D.C. servo motor 102. The servo motor 102 is reversible so that the lens can be moved both upwardly and downwardly. Similarly, the lens 128 is translated linearly along a horizontal line by a ball screw 136 which is driven by the yaw axis D.C. servo motor 112. The translated position of the lens 120 is detected by a shaft angle encoder 138, which may be either analog or digital, and which may typically comprise a multiturn pot the wiper of which is mechanically connected to the ball screw 136. Similarly, the translated position of lens 128 is detected by a shaft angle encoder 140 for detecting the angle position of ball screw 134. The output from the shaft angle encoders 138 and 140 is applied to suitable pitch angle and yaw angle encoder circuits 142 and 144, respectively, which produce either analog or digital signals at the outputs 146 and 148. These output signals may be calibrated to represent the pitch and yaw angles, respectively, of the reflecting body 12 with respect to predetermined arbitrary axes.

To summarize the operation of the system 10, the beam from the laser light supply 18 is modulated by the tuning fork light beam chopper 30 to provide a means for producing an A.C. voltage signal at the quadrant detector 48. This light beam is then directed by the beam splitter 36 through the beam bender assembly 44 and strikes the reflective surface of the body 12 where it is reflected back through the beam bender assembly 44 onto the quadrant detector 48. If the beam falls equally on the four quadrants A–D on the quadrant detector 48, the output voltages A–D will be equal with the result that no yaw or pitch error signal will be produced by the sum and difference network 50 and the servo motors 102 and 112 will not be operated. However, if the light beam falls more in one quadrant than in another, the quadrant receiving the most light will produce a greater signal which will be resolved into yaw and pitch error signals by the sum and difference network 50. The yaw and pitch error signal is then processed and amplified to drive the servo motors 102 and/or 112 which move the lenses 120 and 128 in the directions necessary to recenter the beam on the quadrant detector 48 by bending the reflected beam from the body 12. When the beam is again centered on the quadrant detector 48, a null condition is established and the lenses 120 and 128 remain stationary. The position of the lens 120 is then representative of the pitch angle of the body 12 and this position is detected by the shaft angle encoder 138 and transformed to a usable output signal by the encoder circuit 142. Similarly, the position of lens 128 is representative of the yaw angle of the body 12 and the position of the lens is detected by the encoder 140 and converted to a usable output signal by the encoder circuit 144.

The system 10 has relatively high resolution without requiring precision mechanical parts because of the optical leverage achieved by using the beam bender assembly 44 coupled with the resolution of the quadrant detector 48. The quadrant detector 48 is maintained stationary. The null point is achieved by optically bending the light source with the beam bender assembly 44 which requires a relatively large mechanical movement in order to achieve a relatively small bend in the light beam. The quadrant detector 48 permits the beam to be focused to a very small point and still have the capability of measuring slight differences in the quantity of light falling into the respective quadrants. The system 10 inherently has long term stability. By utilizing the sum signal from the quadrant detector 48 as the demodulating reference voltage, any distortion in the waveform of the light as a result of changes in the modulator means 30, or any frequency drifts, are automatically compensated. Also, by using the sum signal for automatic gain control, any decay or other changes in the intensity of the light supply 18 or in the sensitivity of the quadrant detector can be automatically compensated so that the four quadrant signals A–D will be automatically maintained in the proper proportionate relationship to the demodulating reference signal while simultaneously maintaining the demodulating reference signal at a preselected amplitude. This permits the overall gain of the system to be maintained constant so that the initial resolution of the system can be maintained. Although it is desirable for the quadrant detector 48 to be fabricated as a single unit on a single semiconductor substrate so that any decay or temperature changes of the four quadrant areas will be uniform, the quadrant detector can be comprised of a beam splitter for directing the beam onto a pair of detectors each having two separate sensing areas. In this case, it would be equivalent to using only areas A and B in order to resolve the law angle and areas A and D to resolve the pitch angle. This system has the advantage of reducing the complexity of the sum and difference network since the signals A–B and A–D can be derived directly. However, such a system has the disadvantage that the detectors might not be at the same temperature and might have different decay rates, and further, a sum signal could not be derived for use as the demodulating reference signal or have the automatic gain control function.

It should also be pointed out that the light source could be positioned on the body 12, rather than reflected from the body 12. In the latter case, the system 10 would then be sensitive to translational movement of the body 12 in the two coordinate directions other than parallel to the optical axis of the system 10.

Although a preferred embodiment of the invention has been described in detail, it is to be understood that various changes, substitutions and alterations can be made therein without departing from the spirit and scope of the invention as defined by the appended claims.

What is claimed is:

1. In a system for determining the position of a body relative to at least one predetermined axis, the combination of:
   a light source for producing a collimated beam of light radiating from the body along a path the position of which, relative to a predetermined optic path, is representative of the position of the body relative to the axis,
   optical sensing means including an image plane located along the optic path for sensing the position of the beam on the image plane and producing an electrical output signal representative of the position of the beam relative to at least one null axis intersecting the image plane,
   servo circuit means coupled to the optical sensing means for producing a servo error signal from the electrical output signal of the optical sensing means when the beam is not positioned at the null axis,
   servo-operated optomechanical means located along the optical path for bending the collimated beam in response to a servo error signal from the servo circuit means in a direction to cause the beam to be positioned on the null axis, and
   readout means coupled to the servo-operated optomechanical means for indicating the condition of the optomechanical means, which condition is representative of the position of the observed body relative to the predetermined axis.

2. In a system for determining the position of a body relative to first and second orthogonal reference axes, the combination of:
   a light source for producing a collimated beam of light radiating from the body along a path relative to an optical axis extending normal to the reference axis, the position of the path of the beam relative to the optical axis being representative of the position of the body relative to the two reference axes,
   optical sensing means located on the optical axis including an image plane divided into quadrants by first and second orthogonal sensing axes optically aligned with the first and second orthogonal reference axes, respectively, said optical sensing means including means for producing four electrical output signals, each output signal being representative of the photon energy of the collimated beam in one of the quadrants,
   resolving circuit means coupled to the optical sensing means for producing a first error signal from the four output signals representative of the position of the beam relative to the first sensing axis and a second error signal from the four output signals representative of the position of the beam relative to the second sensing axis, opto-electromechanical servo means located along the optical axis and driven by the first and second error signals for bending the collimated beam in response to the first error signal in a first direction to reposition the beam at the first sensing axis and for bending the collimated beam in response to the second error signal in a second direction normal to the first direction to reposition the beam at the second sensing axis, and readout means coupled to the opto-electromechanical servo means for indicating the condition of the opto-electromechanical servo means, which condition is representative of the position of the body relative to the first and second reference axis.

3. The combination defined in claim 2 wherein the light source comprises means for projecting a collimated beam of light along the optical axis onto a reflective surface on the body where it will be reflected back along a path the relative position of which with respect to the optical axis is representative of the position of the body with respect to the first and second orthogonal reference axes.

4. The combination defined in claim 2 wherein the opto-electromechanical servo means comprises a first positive and negative lens pair having matched focal lengths located on the optical axis, one lens of the first lens pair being linearly translatable by a first servo drive means in a direction optically parallel to said first direction for bending the beam in said first direction, and a second positive and negative lens pair having matched focal lengths located on said optical axis, one of the first pair being linearly translatable by a second servo drive means in a direction optically parallel to said second direction for bending the beam in said second direction.

5. The combination defined in claim 4 wherein the light source comprises means for projecting a collimated beam of light along the optical axis through the first and second lens pairs and onto a reflective surface on the body where it will be reflected back along a path the relative position of which with respect to the optical axis is representative of the position of the body with respect to the first and second orthogonal reference axes.

6. The combination defined in claim 2 wherein:
the collimated beam of light is modulated at a predetermined frequency whereby the four electrical output signals from the optical sensing means will be A.C. signals having the same frequency and phase as that of the modulated beam of light and an amplitude representative of the photon energy striking the sensing means in the respective quadrants, and wherein the resolving circuit means comprises means for producing a first error signal representative of the sum of the output signals from the two quadrants on one side of the first sensing axis less the sum of the output signals from the two quadrants on the other side of the first sensing axis, a second error signal equal to the sum of the output signals from the quadrants on one side of the second sensing axis less the sum of the output signal from the quadrants on the other side of the second sensing axis, and a reference signal equal to the sum of the output signals from each of the four quadrants, and wherein the opto-electromechanical servo means compares the reference signal with the first and second error signals to contact the bending of the beam.

7. The combination defined in claim 6 wherein the opto-electromechanical servo means comprises:
a first amplifier means coupled to receive the reference output signal including automatic gain control circuit means for maintaining the output at a predetermined amplitude, second and third amplifier means coupled to receive and amplify the first and second error signals, respectively, the second and third amplifier means including gain control circuit means coupled to the automatic gain control circuit means of the first amplifier for maintaining the gain of the second and third amplifier, respectively, in a predetermined ratio to the gain of the first amplifier.

8. The combination defined in claim 7 further characterized by:
a first synchronous demodulator circuit means coupled to the outputs of the first and second amplifier means for producing a D.C. output signal the polarity of which is determined by the relationship of the phase of the output signal of the second amplifier to the phase of the output signal of the first amplifier and the magnitude of which is proportional to the amplitude of output signal from the second amplifier, a second synchronous demodulator circuit means coupled to the outputs of the first and third amplifiers for producing a D.C. output signal the polarity of which is determined by the relationship of the phase of the output signal of the third amplifier and phase of the output signal of the first amplifier and the magnitude of which is proportional to the amplitude of the output of the third amplifier, and first and second servo amplifier means connected to the outputs of the first and second demodulator circuit means for driving a servo-operated optomechanical means in response to the output signal of the respective demodulation circuit means for bending the light beam in the first and second directions, respectively.

9. The combination defined in claim 6 wherein:
the optical sensing means comprises a quadrant matrix formed by four photovoltaic semiconductor diodes formed on a common semiconductor substrate, and wherein the resolving circuit means includes a field effect transistor for each output of the optical sensing means connected in source-follower configuration, the control gate of each transistor being connected to an output of a quadrant, and a sum and difference transformer matrix having inputs capacitively coupled to the source of the field effect transistor for producing the first and second error signals and the reference signal.

10. A system for detecting the position of a light beam relative to a pair of orthogonal null axes and producing an error signal suitable for driving a servo system for repositioning the light beam at the intersection of the null axes, comprising:
optical sensing means having four quadrants formed by first and second orthogonal sensing axes, each quadrant comprising a photovoltaic semiconductor diode for producing a voltage signal representative of the total photon energy falling in the respective quadrant at one of four outputs, and resolver circuit means coupled to the outputs of the optical sensing means for producing a first error signal from the four output signals representative of the position of the beam relative to the first sensing axis and a second error signal from the four output signals representative of the position of the beam relative to the second sensing axis, whereby the first and second error signals may be used to reposition the optical beam at the intersection of the orthogonal null axes.

11. A system for detecting the position of a light beam modulated at an A.C. frequency relative to a pair of orthogonal null axes and producing an error signal suitable for driving a servo system for repositioning the light beam at the intersection of the null axes, comprising:
optical sensing means having four quadrants formed by first and second orthogonal sensing axes, each quadrant comprising an optical sensor for producing a voltage signal representative of the total instantaneous photon energy falling in the respective quadrant at one of four outputs, and resolver circuit means coupled to the optical sensing means for producing a first error signal representative of the sum of the output signals from the two quadrants on one side of one of the orthogonal null axes less the sum of the output signals from the two quadrants on the other side of said one orthogonal null axis, for producing a second error signal equal to the sum of the output signals from the quadrants on one side of the other null axis less the sum of the output signals from the quadrants on the other side of said other null axis, and for producing a reference signal equal to the sum of the output signals from the four quadrants, whereby the first and second error signals may be compared with the reference signal and used to drive a servo system for repositioning the light beam at the intersection of the null axis.

12. The combination defined in claim 11 further characterized by:

a first amplifier means coupled to recieve the reference output signal including automatic gain control circuit means for maintaining the output at a predetermined amplitude, second and third amplifier means coupled to receive and amplify the first and second error signals, respectively, the second and third amplifier means including gain control circuit means coupled to the automatic gain control circuit means of the first amplifier means for maintaining the gain of the second and third amplifier means, respectively, in a predetermined ratio to the gain of the first amplifier means.

13. The combination defined in claim 12 further characterized by:

a first synchronous demodulator circuit means coupled to the outputs of the first and second amplifier means for producing a D.C. output signal the polarity of which is determined by the relationship of the phase of the output signal of the second amplifier to the phase of the output signal of the first amplifier and the magnitude of which is proportional to the amplitude of the output signal from the second amplifier, and a second synchronous demodulator circuit means coupled to the outputs of the first and third amplifiers for producing a D.C. output signal the polarity of which is determined by the relationship of the phase of the output signal of the third amplifier and the phase of the output signal of the first amplifier, and the magnitude of which is proportional to the amplitude of the output of the third amplifier.

14. The combination defined in claim 11 wherein:

the optical sensing means comprises a quadrant matrix formed by four photovoltaic semiconductor diodes formed on a common semiconductor substrate, and wherein the resolving circuit means includes a field effect transistor for each output of the optical sensing means connected in source-follower configuration, the control gate of each transistor being connected to an output of a quadrant, and a sum and difference transformer matrix having inputs capacitively coupled to the source of the field effect transistor for producing the first and second error signals and the reference signal.

References Cited

UNITED STATES PATENTS

| | | | |
|---|---|---|---|
| 2,982,859 | 5/1961 | Steinbrecher | 250—203 X |
| 3,135,857 | 6/1964 | Von Voros | 250—202 X |
| 3,155,452 | 11/1964 | Plankel | 250—202 X |
| 3,207,904 | 9/1965 | Heinz | 250—208 X |
| 3,375,750 | 4/1968 | Ellis et al. | 356—152 |

JAMES W. LAWRENCE, Primary Examiner

C. R. CAMPBELL, Assistant Examiner

U.S. Cl. X.R.

250—202, 203, 208, 209, 210; 356—138, 152, 172